P. A. RECORDS.
PUSHER ATTACHMENT FOR TRACTORS.
APPLICATION FILED JUNE 21, 1920.
1,350,838.
Patented Aug. 24, 1920.
2 SHEETS—SHEET 1.
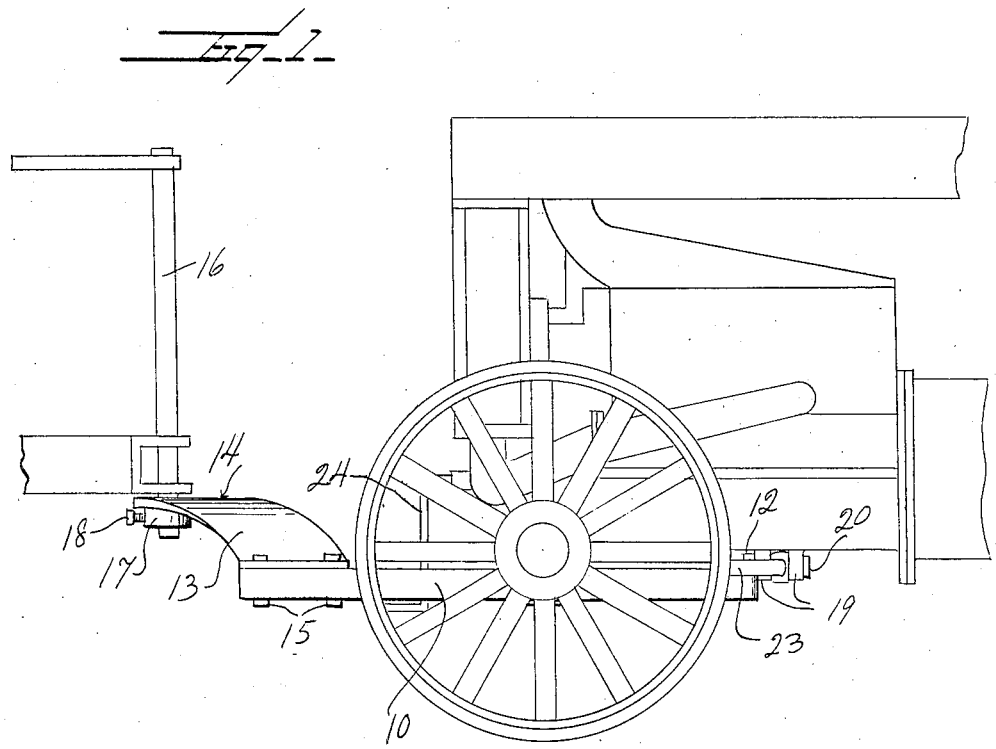
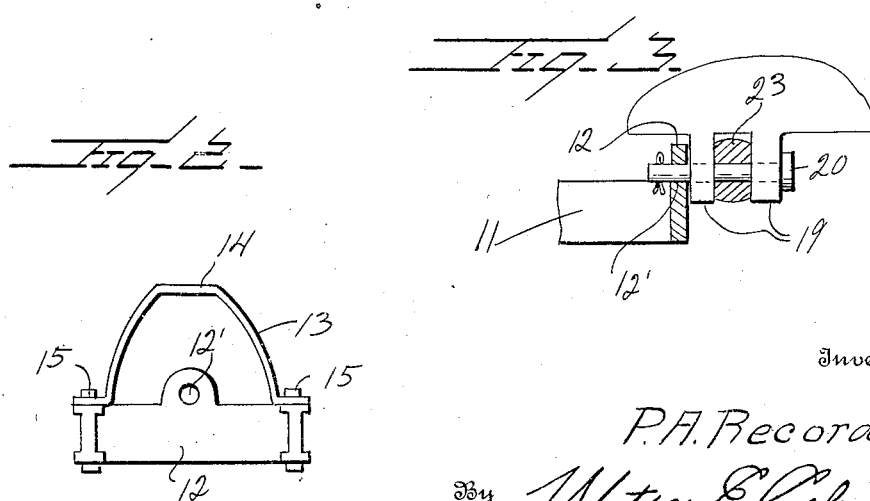
Inventor
P. A. Records
By Watson E. Coleman
Attorney

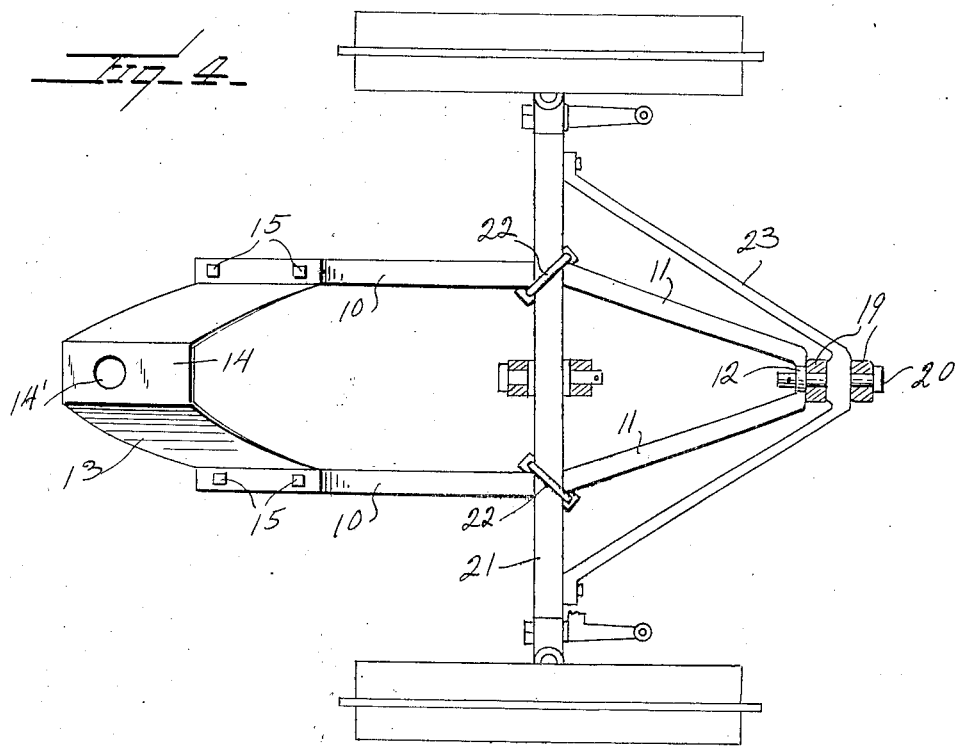
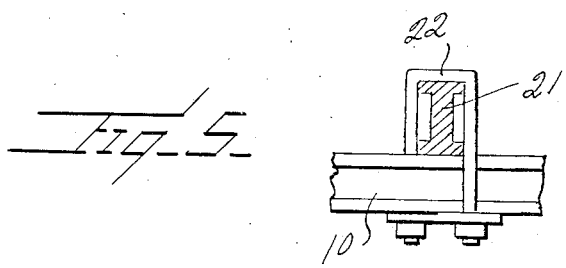

UNITED STATES PATENT OFFICE.

PAUL A. RECORDS, OF PERRYTON, TEXAS.

PUSHER ATTACHMENT FOR TRACTORS.

1,350,838.  Specification of Letters Patent.  Patented Aug. 24, 1920.

Application filed June 21, 1920. Serial No. 390,450.

*To all whom it may concern:*

Be it known that I, PAUL A. RECORDS, a citizen of the United States, residing at Perryton, in the county of Ochiltree and State of Texas, have invented certain new and useful Improvements in Pusher Attachments for Tractors, of which the following is a specification, reference being had to the accompanying drawings.

This invention relates to pusher attachments for tractors whereby the tractor may be connected with a grain header for pushing the same.

An important object of the invention is to provide a device of the above character which is extremely simple in construction and which may be readily attached to both the tractor and the grain header.

A further object of the invention is to provide a device of this character which is efficient in operation and the parts of which are not likely to get out of order.

Other objects and advantages of the invention will become apparent throughout the course of the following description.

In the accompanying drawings wherein for the purpose of illustration is shown a preferred embodiment of my invention and wherein like reference characters designate like parts throughout:

Figure 1 is a side elevation showing my device in use for attaching a Fordson tractor to a header.

Fig. 2 is a front elevation of my attachment.

Fig. 3 is a sectional view partly in elevation showing the attachment of the rear foot of my device to the lugs used on the Fordson tractor as a support for the brace or rib rods thereof.

Fig. 4 is a plan view partly in section showing my device attached to a Fordson tractor, and Fig. 5 is a sectional view showing the manner of attaching the side bars of the pusher frame to the axle.

In the construction of my invention I employ a frame composed of side members 10 parallel at their forward portions and tapering rearwardly as at 11 to a connecting end 12 preferably provided with an upstanding foot having an opening 12' therein. In the actual construction of my invention I prefer that the side members 10 and end member 12 shall be formed from a single piece of suitable material such as channel iron having the upper flange thereof upbent at the end 12 to form a foot provided with an opening 12'.

The forward end of the members 10 are connected by a bridge member 13 provided centrally thereof with a horizontal portion 14 having in its forward end an opening 14'. This bridge member is secured to the forward end of the side frames 10 by means of bolts 15 or the like. The bridge member 13 is preferably arched upwardly and inclined forwardly for a purpose hereinafter to appear.

As is well known, grain headers are provided at the rear end thereof with a steering column 16 by means of which the header is guided. In the application of my invention, in connecting the tractor with the grain header the lower end of the steering post 16 is received by the opening 14' of the bridge member 13 and a collar 17 placed upon the steering post below the bridge piece and held in position by means of a set screw 18 or the like, to prevent downward displacement of the bridge piece, the arching and forward inclination of the bridge piece rendering the positioning of the collar simple. The rear end of the pusher attachment is now placed beneath the tractor which is provided upon the under surface with downwardly extending lugs 19, suitably apertured for the reception of a bolt 20 which extends through the opening 12' of the foot 12 and secures the rear end of the pusher frame to the tractor. The arms 10 pass beneath the axle 21 thereof, being secured thereto by means of U bolts 22 after the tractor and header have been properly alined.

It will be noted that the U bolts 22 are so positioned that they engage the side walls of the frame at the point where they start to converge. It will be obvious that the forward thrust from the axle 21 is in a straight line at the two sides of the device and that the rear portions 11 which converge are solidly attached in a three-point suspension preventing side play of the frame and evenly distributing the thrust which may be imparted by the lugs 19. The converging portions likewise serve the purpose of preventing distortion of the front axle upon which the major portion of the thrust is placed.

In the application of my device to a Fordson tractor, for which it is particularly adapted, the lugs 19 are those ordinarily used for the purpose of attachment, of the angular brace or radius rods 23 thereof, and the arms 10 are sufficiently widely spaced in order to afford clearance permitting rotation of the starting handle or crank 24 in starting the engine.

It will be obvious that in the construction of my invention many changes in the shape and general arrangement of the parts herein shown may be necessary in the application thereof to tractors and headers of different constructions and I accordingly, do not limit myself to the specific construction hereinbefore set forth, but may make any such changes without departing from the spirit of the invention, or the scope of the subjoined claims.

Having now described my invention, what I claim is:

1. A pusher attachment for tractors embodying the usual front axle and body frame, comprising a pair of side members, a member connecting the rear ends of said side members embodying an upstanding foot provided with an opening, a lug extending downwardly from the tractor body and provided with an opening adapted to coact with the opening of said foot to receive an attaching means, U bolts carried by said arms and adapted to engage the front axle of the tractor, and a bridge member connecting the forward ends of said side members and provided centrally of the forward end thereof with an opening.

2. A pusher attachment for tractors embodying the usual front axle and body frame, comprising a pair of side members, a member connecting the rear ends of said side members embodying an upstanding foot provided with an opening, a lug extending downwardly from the tractor body and provided with an opening adapted to coact with the opening of said foot to receive an attaching means, U-bolts carried by said arms and adapted to engage the front axle of the tractor, and a bridge member connecting the forward ends of said side members and provided centrally of the forward end thereof with an opening, said bridge member being arched upwardly and inclined forwardly.

3. A pusher attachment for a tractor embodying the usual front axle and body frame and provided forwardly with a rotatable starting handle, comprising a pair of side members, a member connected to the rear ends of said side members embodying an upstanding foot provided with an opening, a lug extending downwardly from the tractor body and provided with an opening adapted to coact with the opening of said foot to receive an attaching means, U-bolts carried by said sides arms and adapted to engage the front axle of the tractor and a bridge member connecting the forward ends of said side members and provided centrally with an opening, said bridge member being arched upwardly and inclined forwardly, said side members being disposed upon opposite sides of said starting crank and spaced a sufficient distance therefrom to permit rotation thereof.

4. A pusher attachment for tractors embodying the usual front axle and body frame, comprising a pair of side members having the forward end thereof parallel and the rear ends thereof converging and joined by a member provided with an upstanding foot, said foot being provided with an opening, lugs extending downwardly from the tractor body and provided with openings adapted to coact with opening of said foot to receive an attaching means, U-bolts carried by said arms and adapted to connect with converging portions thereof to the front axle of the tractor and a bridge member connecting the forward ends of said side members and provided centrally of the forward end thereof with an opening, said bridge member being arched and inclined forwardly whereby the opening thereof is disposed forwardly of the forward ends of said arms and vertically spaced with relation thereto.

In testimony whereof I hereunto affix my signature.

PAUL A. RECORDS.